US012736982B2

(12) United States Patent
Ren et al.

(10) Patent No.: US 12,736,982 B2
(45) Date of Patent: Sep. 15, 2026

(54) SELECTING A FRONTIER GOAL FOR AUTONOMOUS MAP BUILDING WITHIN A SPACE

(71) Applicant: QUALCOMM Incorporated, San Diego, CA (US)

(72) Inventors: Jiangtao Ren, Beijing (CN); Lei Xu, Jr., Beijing (CN); Hao Xu, Beijing (CN); Yanming Zou, Beijing (CN); Ruowei Wang, Beijing (CN); Lei Ma, San Diego, CA (US); Xiaolong Shi, Beijing (CN); Jingwei Rao, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 116 days.

(21) Appl. No.: 18/293,990

(22) PCT Filed: Oct. 13, 2021

(86) PCT No.: PCT/CN2021/123426

§ 371 (c)(1),
(2) Date: Jan. 31, 2024

(87) PCT Pub. No.: WO2023/060461

PCT Pub. Date: Apr. 20, 2023

(65) Prior Publication Data

US 2024/0338035 A1 Oct. 10, 2024

(51) Int. Cl.

*G05D 1/644* (2024.01)
*G05D 105/80* (2024.01)
(Continued)

(52) U.S. Cl.

CPC .......... *G05D 1/6445* (2024.01); *G06T 7/246* (2017.01); *G06T 7/579* (2017.01);
(Continued)

(58) Field of Classification Search

CPC ............ G05D 1/6445; G05D 2105/87; G05D 1/0217; G05D 1/0248; G05D 1/0274;
(Continued)

(56) References Cited

U.S. PATENT DOCUMENTS

2019/0170527 A1* 6/2019 Inoue .................... G01C 21/26
2020/0117210 A1* 4/2020 Ren ........................ G08G 5/76
(Continued)

FOREIGN PATENT DOCUMENTS

CN 106444769 B 5/2019

OTHER PUBLICATIONS

International Search Report and Written Opinion—PCT/CN2021/123426—ISA/EPO—Apr. 11, 2022 12 pages.
(Continued)

*Primary Examiner* — Kenneth J Malkowski
*Assistant Examiner* — Ibrahim Abdoalatif Alsomairy
(74) *Attorney, Agent, or Firm* — Polsinelli LLP/QUALCOMM Incorporated

(57) ABSTRACT

Embodiments include methods executed by a processor of a robotic device for selecting a frontier goal for autonomous map building within a space, including determining trajectory costs for the robotic device traversing from an occupied area to each of a plurality of available frontier goals, wherein the plurality of available frontier goals include positions within the space from which the robotic device is configured to collect information to autonomously build a map of the space, determining co-visibility costs for each of the plurality of available frontier goals, determining a frontier cost for each of the plurality of available frontier goals based on a difference between the trajectory cost and the co-visibility cost of the respective available frontier goal; and selecting one of the plurality of available frontier goals having a lowest determined frontier cost.

25 Claims, 9 Drawing Sheets

(51) Int. Cl.
*G06T 7/246* (2017.01)
*G06T 7/579* (2017.01)

(52) U.S. Cl.
CPC .................... *G05D 2105/87* (2024.01); *G06T 2207/30241* (2013.01); *G06T 2207/30252* (2013.01)

(58) Field of Classification Search
CPC ..................... G06T 7/246; G06T 7/579; G06T 2207/30241; G06T 2207/30252; G01C 21/3453; G01C 21/3837; G01C 21/3848; G01C 21/343
See application file for complete search history.

(56) References Cited

U.S. PATENT DOCUMENTS

| | | | | |
|---|---|---|---|---|
| 2020/0200547 | A1* | 6/2020 | Miller | G01C 21/3874 |
| 2021/0285778 | A1* | 9/2021 | Ito | G06Q 10/047 |

OTHER PUBLICATIONS

Kulich M., et al., "An Integrated Approach to Goal Selection in Mobile Robot Exploration", Sensors, vol. 19, No. 6, 1400, Mar. 21, 2019, pp. 1-27.

* cited by examiner smooth road slow road congestion road

702

From Block 712

Classify Each Of The Plurality Of Available Frontier Goals As Either A One-Glance-Only or A Multi-Glance Frontier Using Contextual Information, Wherein Each One-Glance-Only Frontier Is closer To The Occupied Area than The Multi-Glance Frontiers

720

To Block 714

FIG. 7B

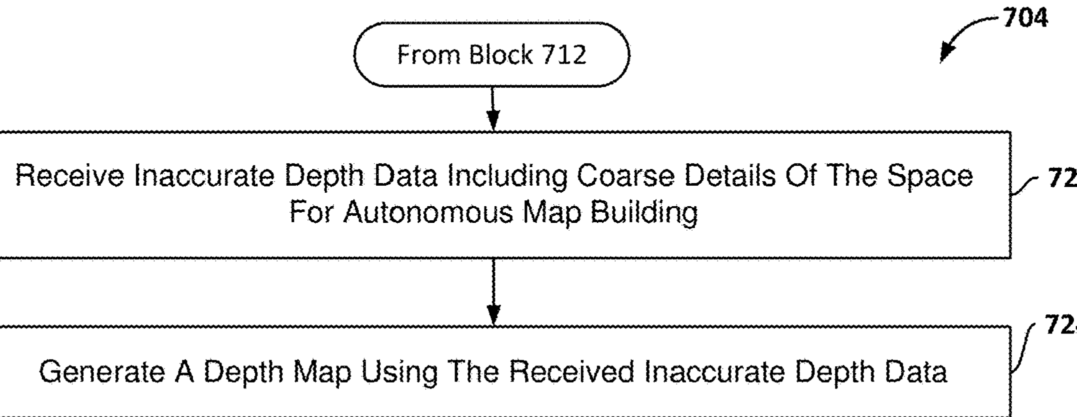

Receive Sparse Feature Point Information Using Visual Simultaneous Localization And Mapping (vSLAM)

726

Generate A Feature Map Of The Space For Autonomous Map Building Using The Received Sparse Feature Point Information Projected Onto A Horizontal Plane, Wherein The Distance To The Trajectory Point From A Current Position Of The Robotic Device Is Determined From The Generated Depth Map And Feature Map

728

To Block 712

FIG. 7C

SELECTING A FRONTIER GOAL FOR AUTONOMOUS MAP BUILDING WITHIN A SPACE

BACKGROUND

Robotic devices are being developed for a wide range of applications. Robotic devices may be equipped with cameras capable of capturing an image, a sequence of images, or video, and using such data in performing a robotic operation, such as navigation, guiding an actuator, etc. Some robotic devices may be equipped with an image sensor, such as a camera.

Robotic devices may use image data from the camera to perform any number of tasks. For example, using image data robotic devices may learn about their surrounding environment by building a map before using the map for navigation. Manual control for building a map requires experience and training that is not easily obtained. Autonomous Exploration (AE) aims to build such maps efficiently and effectively without any human-interaction. For AE, one problem is determining where the robotic device should go next among many potential positions within a space being explored.

SUMMARY

Various aspects include methods that may be implemented on a processor of a robotic device for selecting a frontier goal for autonomous map building within a space. Various aspects may include: determining trajectory costs for the robotic device traversing from an occupied area to each of a plurality of available frontier goals within the space, in which the plurality of available frontier goals include positions within the space from which the robotic device is configured to collect information to autonomously build a map of the space; determining co-visibility costs for each of a select classification of the plurality of available frontier goals based on a ratio of a number of en-route trajectory one-glance-only frontiers points traversed to reach the respective available frontier goal over a length of a trajectory route used to reach the respective available frontier goal; determining a frontier cost for each of the plurality of available frontier goals based on a difference between the trajectory cost and the co-visibility cost of the respective available frontier goal; and selecting one of the plurality of available frontier goals having a lowest determined frontier cost.

In some aspects, determining trajectory costs for the robotic device traversing to each of a plurality of available frontier goals within the space may include determining the trajectory costs for each of the plurality of available frontier goals based on a length, speed, and rotation associated with the respective available goal.

In some aspects, determining a frontier cost for each of the plurality of available frontier goals based on a difference between the trajectory cost and the co-visibility cost of the respective available frontier goal may include determining the frontier cost for each of the plurality of available goals using lower resolution mapping than a higher resolution mapping used for navigation to the selected frontier goal.

In some aspects, determining trajectory costs for the robotic device traversing to each of a plurality of available frontier goals within the space may include determining the determined trajectory costs for each of the plurality of available goals based on a sum of a friendliness cost and a rotation cost of the respective available frontier goal.

In some aspects, the friendliness cost for each of the plurality of available goals may be based on a sum of the ratios of a length over a speed of each trajectory point along a route to the respective available frontier goal.

In some aspects, the rotation cost for each of the plurality of available goals may be based on a duration of rotations required while traversing to the respective available frontier goal.

Some aspects may further include classifying each of the plurality of available frontier goals as either a one-glance-only or a multi-glance frontier using contextual information, in which each one-glance-only frontier is closer to the occupied area than the multi-glance frontiers.

Some aspects may further include receiving inaccurate depth data including coarse details of the space for autonomous map building; generating a depth map using the received inaccurate depth data; receiving sparse feature point information using visual simultaneous localization and mapping (vSLAM); generating a feature map of the space for autonomous map building using the received sparse feature point information projected onto a horizontal plane; and determining a distance to a trajectory point along a route to a frontier goal from a current position of the robotic device from the generated depth map and feature map.

In some aspects, the difference between the trajectory cost and the co-visibility cost of the respective available goals may be determined using first and second percentages of the trajectory cost and the co-visibility cost respectively, wherein a sum of the first and second percentages is one.

Further aspects may include a robotic device configured with processor-executable instructions to perform operations of any of the methods summarized above. Further aspects may include a processing device for use in a robotic device configured to perform operations of any of the methods summarized above. Further aspects may include a robotic device including means for performing functions of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIGS. 7A-7C are process flow diagrams each illustrating a method of selecting a frontier goal for autonomous map building within a space executed by a processor of a robotic device according to various embodiments.

DETAILED DESCRIPTION

Figure 1:
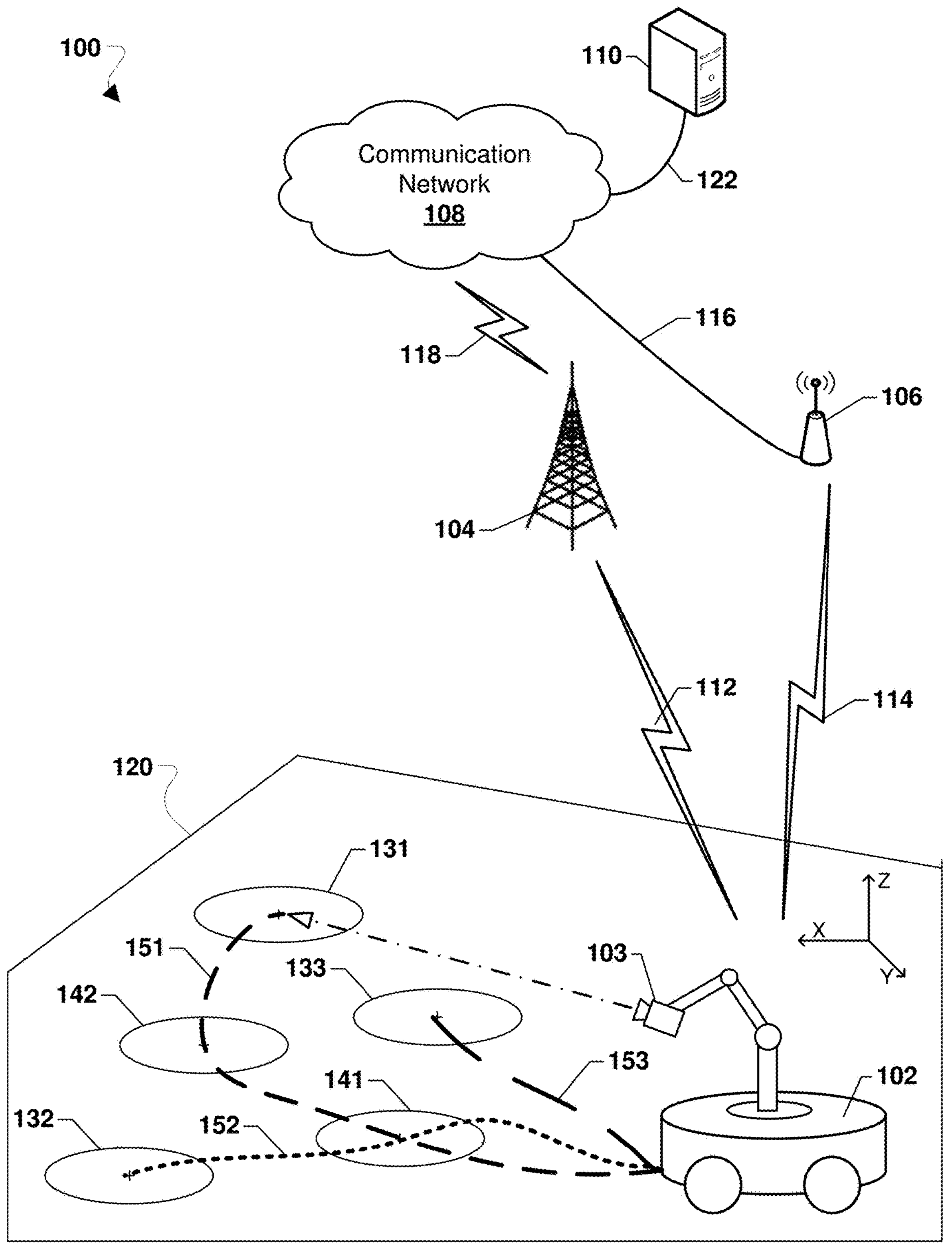
FIG. 1 is a system block diagram of a robotic device operating within a space and in communication with a communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Building a complete map within a space by a robotic device generally involves the robotic device exploring potential positions (referred to herein as "frontier goals") within that space and surveying the space from each such location. The robotic device needs to move around the space in order to build the complete map. Once the robotic device moves through the location of a frontier goal, that frontier goal "disappears" from a list of outstanding frontier goals. Preferably, the robotic device explores the space in a way that makes all the frontier goals disappear as fast as possible. However, in order to quickly and efficiently make the frontier goals disappear, the robotic device must determine an order in which to move through the frontier goals, and particularly determining the best frontier goal to move to or through next.

A conventional method of path planning for such purposes uses rapidly-exploring random trees (RRT), which is an algorithm-based technique of AE that is designed to efficiently search spaces by randomly building a space-filling tree. The tree is constructed incrementally from samples drawn randomly from the search space and is inherently biased to grow towards large unsearched areas. RRT determines a path by determining a lowest cost path goal for a robotic device. The cost function uses Euclidian distances between a current robotic device position and an identified destination position, which is referred to as a frontier point. In addition, the cost function may use information gain areas defined by a circle of a given radius centered on the frontier point. Such cost functions generally determine the shortest Euclidian distance, but the shortest distance is not always the fastest or most efficient route since it does not take occlusion (i.e., blockage) into consideration. Thus, using Euclidian distances alone for path planning may not develop a most effective or efficient path. Also, little consideration is given to the overall environment of the space, since RRT gathers information about many positions quickly (i.e., at a glance) and is thus not maximized for map building. Further, in RRT positional information is considered in isolation, rather than considering each position's influence on other positions during the robotic device's movement. Additionally, using RRT for path planning using high-resolution navigational maps that may consume a lot of computational power and/or be very time consuming.

Another prior art method of path planning uses frontier-based autonomous exploration. The frontier-based approach tries to maximize the exploration efficiency by selecting and exploring the optimal frontiers between the known and unknown area of a map. In this way, the frontier-based approach selects frontier goals based on a metric of the smallest Euclidian distance between the current robotic device position and a destination position. A drawback of the frontier-based technique is that a route with the smallest Euclidian distance does not always coincide with a route that has the shortest path to the destination. Even the shortest path is not always guaranteed to be the most cost effective path, since some routes may be slower and thus more costly than others. By selecting a goal based on only a distance to that goal, the best goal may not be selected. As a robotic device moves to one determined position, it may update a map based on sensor inputs, such as to update other frontiers. Thus, it is more reasonable to select the goal not only consider the distance but also consider the relationship of the positions, the sensor properties. Additionally, like RRT, using a frontier-based approach for path planning using high-resolution navigational maps may consume a lot of computational power and/or be very time consuming.

Various embodiments perform frontier goal selection for use in enabling a robotic device to map a space or area by combining multiple factors, as listed below, to select the frontier goal for a robotic device to autonomously build the map effectively and efficiently. Various embodiments include methods that may be implemented by a processor of a robotic device for selecting a frontier goal for autonomous map building within a space. In some embodiments, the methods may take into account various factors in selecting a frontier goal. In particular, various embodiments may consider trajectory costs, contextual information, and co-visibility analysis determinations.

Trajectory costs may consider the "friendliness" of a path (e.g., path width, rotation, etc.). For example, it may take less energy and/or time to travel along a path in a wide area, as compared to a shorter path in a narrow area since the robotic device may have to travel more slowly through the narrow area. Contextual information may be used to classify potential goals into at least two types. For example, "one-glance-only" is one type of goal that may be determined, which completes a map or portion thereof with just one look (e.g., a single image frame), such as a goal to reach a location from which the entire space being mapped can viewed or captured in a single camera image. Goal types may be determined from a plurality of frontiers on a map (e.g., a fusion of maps used to define a space), in which each frontier is defined by a continuous number of pixels between an area occupied by the robotic device and the respective frontier. Frontiers associated with pixel counts below a predetermined threshold may be considered one-glance-only frontiers. In this way, one-glance-only frontiers may cover smaller spaces and require less exploration. In contrast "Multi-glance" frontiers are another type of goal, which requires one goal to be determined, mapping to be performed, and then a further goal to be determined. Frontiers associated with pixel counts equal to or above the predetermined threshold may be considered multi-glance frontiers. In this way, multi-glance frontiers may cover larger spaces and require more exploration than one-glance-only frontiers.

Various embodiments may increase the efficiency of map building by using lower resolution maps for frontier goal selection and using higher resolution maps for navigation by the robotic device. Various embodiments utilize an image resolution pyramid to speed up the multi-factor frontier goal determinations. In this way, frontier goal selection may be performed using low or a lowest level resolution maps, while navigational determinations may be performed using high or highest resolution images for determinations.

As used herein, the term "robotic device" refers to one of various types of vehicles, automated and self-propelled machines, and other forms of robots including a camera system and an onboard processing device configured to provide some autonomous or semi-autonomous capabilities. Examples of robotic devices include but are not limited to:

factory robotic devices, autonomous robots, aerial vehicles, such as an unmanned aerial vehicle (UAV); ground vehicles (e.g., an autonomous or semi-autonomous car, a vacuum robot, etc.); water-based vehicles (i.e., vehicles configured for operation on the surface of the water or under water); space-based vehicles (e.g., a spacecraft or space probe); and/or some combination thereof. In some embodiments, the robotic device may be manned. In other embodiments, the robotic device may be unmanned. In embodiments in which the robotic device is autonomous, the robotic device may include an onboard computing device configured to maneuver and/or navigate the robotic device without remote operating instructions (i.e., autonomously), such as from a human operator (e.g., via a remote computing device). In embodiments in which the robotic device is semi-autonomous, the robotic device may include an onboard computing device configured to receive some information or instructions, such as from a human operator (e.g., via a remote computing device), and autonomously maneuver and/or navigate the robotic device consistent with the received information or instructions. A robotic device may include a variety of components and/or payloads that may perform a variety of functions.

In various embodiments, a processor of a robotic device may be configured to perform methods for selecting a frontier goal for autonomous map building within a space. In some embodiments, the methods may include determining trajectory costs for the robotic device traversing to each of a plurality of available frontier goals within the space. The plurality of available frontier goals may include positions within the space from which the robotic device is configured to collect information to autonomously build a map of the space. In some embodiments, the methods may include determining co-visibility costs for each of a select classification of the plurality of available frontier goals based on a ratio of a number of en-route trajectory points traversed to reach of the respective available frontier goal. In some embodiments, the methods may include determining a frontier cost for each of the plurality of available frontier goals based on a difference between the trajectory cost and the co-visibility cost of the respective available frontier goal. In some embodiments, the methods may include selecting one of the plurality of available goals having a lowest determined frontier cost.

Various embodiments may be implemented within a robotic device 120 operating within a space 120 and in communication with a communication system 100, an example of which is illustrated in FIG. 1. With reference to FIG. 1, the communication system 100 may include the robotic device 102, a base station 104, an access point 106, a communication network 108, and a network element 110. In some embodiments, the robotic device 102 may be equipped with a camera 103. In some embodiments, the camera 103 may include a monocular camera, a binocular camera, or a multi-ocular camera.

The base station 104 and the access point 106 may provide wireless communications to access the communication network 108 over a wired communication backhaul 116 and/or a wireless communication backhaul 118, respectively. The base station 104 may include base stations configured to provide wireless communications over a wide area (e.g., macro cells), as well as small cells, which may include a micro cell, a femto cell, a pico cell, and other similar network access points. The access point 106 may include access points configured to provide wireless communications over a relatively smaller area. Other examples of base stations and access points are also possible.

The robotic device 102 may communicate with the base station 104 over a wireless communication link 112, and/or with the access point 106 over a wireless communication link 114. The wireless communication links 112 and 114 and/or the wireless communication backhaul 118 may include a plurality of carrier signals, frequencies, or frequency bands, each of which may include a plurality of logical channels. The wireless communication links 112 and 114 may utilize one or more radio access technologies (RATs). Examples of RATs that may be used in a wireless communication link include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

The network element 110 may include a network server or another similar network element. The network element 110 may communicate with the communication network 108 over a communication link 122. The robotic device 102 and the network element 110 may communicate via the communication network 108. The network element 110 may provide the robotic device 102 with a variety of information, such as navigation information, weather information, information about local air, ground, and/or sea traffic, movement control instructions, and other information, instructions, or commands relevant to operations of the robotic device 102.

In various embodiments, the robotic device 102 may move within the space 120 to reach or traverse through one or more frontier goals 131, 132, 133, 141, 142. In some embodiments, the robotic device 102 may be configured to perform operations to selecting a frontier goal 131, 132, 133, 141, 142 for autonomous map building of the space 120, to enable the robotic device 103 to maneuver in and interact with the environment of the space 120. In some embodiments, the camera 103 may be disposed on a robotic arm or other suitable extension from the robotic device body. In some embodiments, the robotic arm may be configured to move relative to a body of the robotic device 102, and further may be configured with one or more joints that enable a segment of the robotic arm to move relative to another segment of the robotic arm. The movement of the robotic arm and/or any of its segments may be effected by one or more actuators. In some embodiments, the robotic device 102, the camera 103, and/or the space may be measured relative to a three-dimensional coordinate system (represented in FIG. 1 as an X, Y, and Z-axis systems) or optionally a planar coordinate system (i.e., two-dimensional) using just the X and Y-axis.

In some embodiments, the frontier goal selection may include determining trajectory costs for the robotic device 102 traversing to each of a plurality of available frontier goals 131, 132, 133 within the space 120. In some embodiments, the frontier goal selection may also include determining co-visibility costs for each of a select classification of the plurality of available frontier goals 131, 132, 133 based on a ratio of a number of en-route trajectory points 141, 142 traversed to reach the respective available frontier goal 131, 132, 133 over a length of a trajectory route 151, 152, 153 used to reach the respective available frontier goal 131, 132, 133. In some embodiments, the frontier goal selection may further include determining a frontier cost for each of the plurality of available frontier goals 131, 132, 133 based on a difference between the trajectory cost and the co-visibility cost of the respective available frontier goal 131, 132, 133. One of the plurality of available goals 131, 132, 133 having a lowest determined frontier cost, such as the first frontier goal 131, may be selected as the selected frontier goal for autonomous map building within the space 120. Thus, the robotic device 102 may pass through the two en-route trajectory points 141, 142 to reach the first frontier goal 131 along the corresponding trajectory route 151.

Co-visibility analysis considers the effects between potential goals during robotic device travel. For example, when a robotic device moves toward the first frontier goal 131, that robotic device will be near the second frontier goal 132 at the first en-route trajectory point 141. In fact, when the robotic device reaches the first en-route trajectory point 141, the robotic device may be close enough to the second frontier goal 132 to build a map thereof. Further, co-visibility information may be used between potential positions together to select one frontier goal, which may cost less time to reach but may clear more intermediate available frontier goals in a given area to be mapped.

Figure 2:
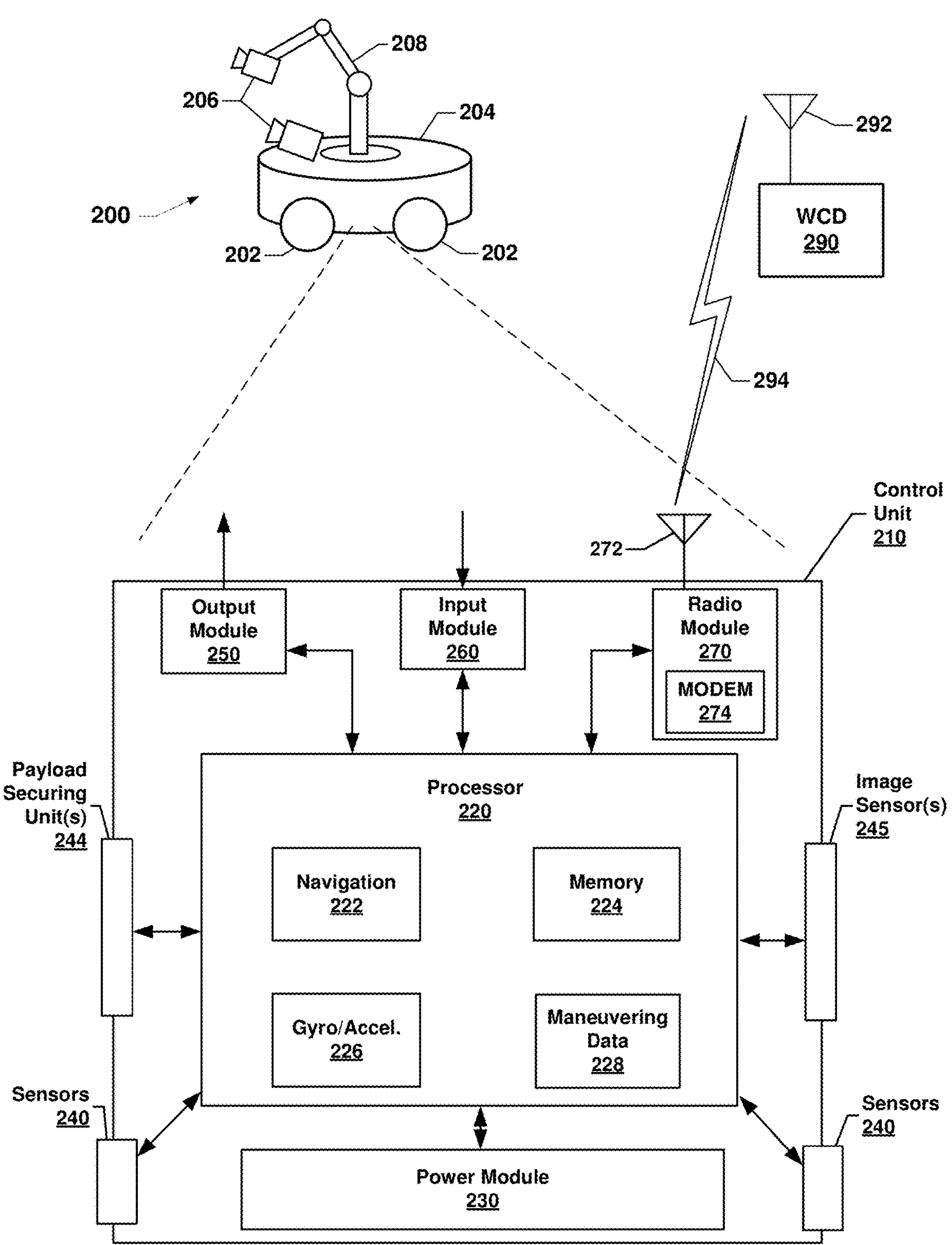
FIG. 2 is a component block diagram illustrating components of a robotic device according to various embodiments.

FIG. 2 is a component block diagram illustrating components of an example robotic device 200 according to various embodiments. Robotic devices may include winged or rotorcraft varieties. An example robotic device 200 is illustrated as a ground vehicle design that utilizes one or more wheels 202 driven by corresponding motors to provide locomotion to the robotic device 200. The illustration of robotic device 200 is not intended to imply or require that various embodiments are limited to ground robotic devices. For example, various embodiments may be used with rotorcraft or winged robotic devices, water-borne robotic devices, and space-based robotic devices.

With reference to FIGS. 1 and 2, the robotic device 200 may be similar to the robotic device 102. The robotic device 200 may include a number of wheels 202, a body 204, and a camera 206 (e.g., camera 103). The frame 204 may provide structural support for the motors and their associated wheels 202 as well as for the camera 206. In some embodiments, the frame may support a camera 206. Additionally or alternatively, in some embodiments, the frame 204 may support an arm 208 or another suitable extension, which may in turn support the camera 206. In some embodiments, the arm 208, or segments of the arm 208, may be configured to articulate or move by one or more joints, bending elements, or rotating elements. Similarly, the camera 206 may be moveably attached to the arm 208 by a joint element that enables the camera 206 to move relative to the arm 208. For ease of description and illustration, some detailed aspects of the robotic device 200 are omitted such as wiring, motors, frame structure interconnects, or other features that would be known to one of skill in the art. While the illustrated robotic device 200 has wheels 202, this is merely exemplary and various embodiments may include any variety of components to provide propulsion and maneuvering capabilities, such as treads, paddles, skids, or any combination thereof or of other components.

The robotic device 200 may further include a control unit 210 that may house various circuits and devices used to power and control the operation of the robotic device 200. The control unit 210 may include a processor 220, a power module 230, sensors 240, one or more payload securing units 244, one or more image sensors 245 (e.g., cameras), an output module 250, an input module 260, and a radio module 270.

The processor 220 may be configured with processor-executable instructions to control travel and other operations of the robotic device 200, including operations of various embodiments. The processor 220 may include or be coupled to a navigation unit 222, a memory 224, a gyro/accelerometer unit 226, and a maneuvering data module 228. The processor 220 and/or the navigation unit 222 may be configured to communicate with a server through a wireless connection (e.g., a cellular data network) to receive data useful in navigation, provide real-time position reports, and assess data.

The maneuvering data module 228 may be coupled to the processor 220 and/or the navigation unit 222, and may be configured to provide travel control-related information such as orientation, attitude, speed, heading, and similar information that the navigation unit 222 may use for navigation purposes, such as dead reckoning between Global Navigation Satellite System (GNSS) position updates. The gyro/accelerometer unit 226 may include an accelerometer, a gyroscope, an inertial sensor, an inertial measurement unit (IMU), or other similar sensors. The maneuvering data module 228 may include or receive data from the gyro/accelerometer unit 226 that provides data regarding the orientation and accelerations of the robotic device 200 that may be used in navigation and positioning calculations, as well as providing data used in various embodiments for processing images.

The processor 220 may further receive additional information from one or more image sensors 245 and/or other sensors 240. In some embodiments, the camera(s) 245 may include an optical sensor capable of infrared, ultraviolet, and/or other wavelengths of light. The sensors 240 may also include a wheel sensor, an inertial measurement unit (IMU), a radio frequency (RF) sensor, a barometer, a sonar emitter/detector, a radar emitter/detector, a microphone or another acoustic sensor, or another sensor that may provide information usable by the processor 220 for movement operations as well as navigation and positioning calculations. The sensors 240 may include contact or pressure sensors that may provide a signal that indicates when the robotic device 200 has made contact with a surface. The payload-securing units 244 may include an actuator motor that drives a gripping and release mechanism and related controls that are responsive to the control unit 210 to grip and release a payload in response to commands from the control unit 210.

The power module 230 may include one or more batteries that may provide power to various components, including the processor 220, the sensors 240, the payload-securing unit(s) 244, the camera(s) 245, the output module 250, the input module 260, and the radio module 270. In addition, the power module 230 may include energy storage components, such as rechargeable batteries. The processor 220 may be configured with processor-executable instructions to control the charging of the power module 230 (i.e., the storage of harvested energy), such as by executing a charging control algorithm using a charge control circuit. Alternatively or additionally, the power module 230 may be configured to manage its own charging. The processor 220 may be coupled to the output module 250, which may output control signals for managing the motors that drive the rotors 202 and other components.

The robotic device 200 may be controlled through control of the individual motors of the rotors 202 as the robotic device 200 progresses toward a destination. The processor

220 may receive data from the navigation unit 222 and use such data in order to determine the present position and orientation of the robotic device 200, as well as the appropriate trajectory route (e.g., 151, 152, 153) towards the destination (e.g., 131, 132, 133) or intermediate sites (e.g., 141, 142). In various embodiments, the navigation unit 222 may include a GNSS receiver system (e.g., one or more global positioning system (GPS) receivers) enabling the robotic device 200 to navigate using GNSS signals. Alternatively or in addition, the navigation unit 222 may be equipped with radio navigation receivers for receiving navigation beacons or other signals from radio nodes, such as navigation beacons (e.g., very high frequency (VHF) omni-directional range (VOR) beacons), Wi-Fi access points, cellular network sites, radio station, remote computing devices, other robotic devices, etc.

The radio module 270 may be configured to receive navigation signals, such as signals from aviation navigation facilities, etc., and provide such signals to the processor 220 and/or the navigation unit 222 to assist in robotic device navigation. In various embodiments, the navigation unit 222 may use signals received from recognizable RF emitters (e.g., AM/FM radio stations, Wi-Fi access points, and cellular network base stations) on the ground.

The radio module 270 may include a modem 274 and a transmit/receive antenna 272. The radio module 270 may be configured to conduct wireless communications with a variety of wireless communication devices (e.g., a wireless communication device (WCD) 290), examples of which include a wireless telephony base station or cell tower (e.g., the base station 104), a network access point (e.g., the access point 106), a beacon, a smartphone, a tablet, or another computing device with which the robotic device 200 may communicate (such as the network element 110). The processor 220 may establish a bi-directional wireless communication link 294 via the modem 274 and the antenna 272 of the radio module 270 and the wireless communication device 290 via a transmit/receive antenna 292. In some embodiments, the radio module 270 may be configured to support multiple connections with different wireless communication devices using different radio access technologies.

In various embodiments, the wireless communication device 290 may be connected to a server (e.g., 110) through intermediate access points. In an example, the wireless communication device 290 may be a server of a robotic device operator, a third party service (e.g., package delivery, billing, etc.), or a site communication access point. The robotic device 200 may communicate with a server through one or more intermediate communication links, such as a wireless telephony network that is coupled to a wide area network (e.g., the Internet) or other communication devices. In some embodiments, the robotic device 200 may include and employ other forms of radio communication, such as mesh connections with other robotic devices or connections to other information sources (e.g., balloons or other stations for collecting and/or distributing weather or other data harvesting information).

In various embodiments, the control unit 210 may be equipped with an input module 260, which may be used for a variety of applications. For example, the input module 260 may receive images or data from an onboard camera or sensor, or may receive electronic signals from other components (e.g., a payload).

Figure 3:
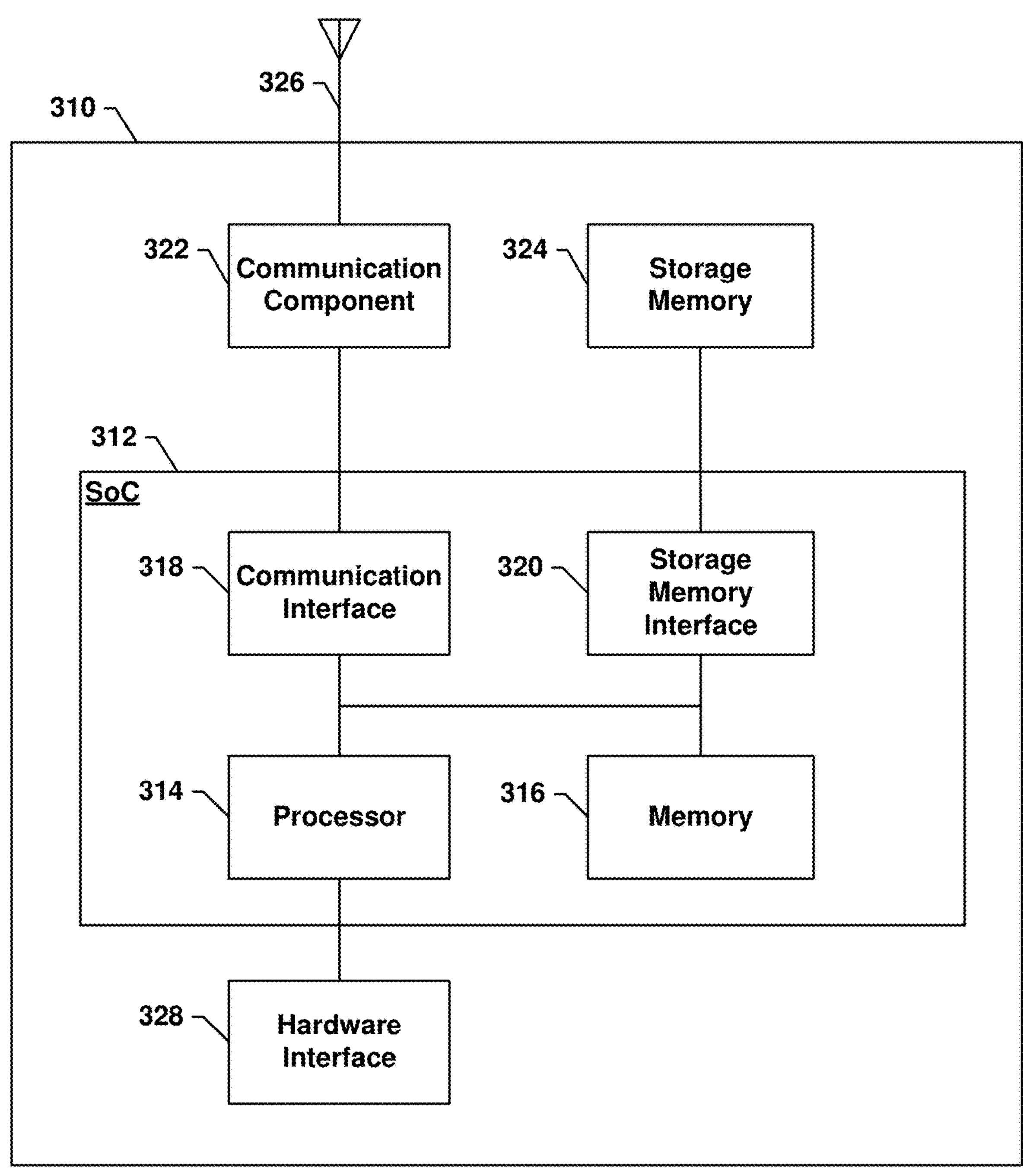
FIG. 3 is a component block diagram illustrating a processing device suitable for use in robotic devices implementing various embodiments.

FIG. 3 is a component block diagram illustrating a processing device 310 suitable for use in robotic devices implementing various embodiments. With reference to FIGS. 1-3, the processing device 310 may be configured to be used in a robotic device and may be configured as or including a system-on-chip (SoC) 312. In some embodiments, a variety of components (e.g., the processor 220, the output module 250, the radio module 270) may be integrated in the processing device 310. The SoC 312 may include (but is not limited to) a processor 314, a memory 316, a communication interface 318, and a storage memory interface 320. The processing device 310 or the SoC 312 may further include a communication component 322, such as a wired or wireless modem, a storage memory 324, an antenna 326 for establishing a wireless communication link, and/or the like. The processing device 310 or the SoC 312 may further include a hardware interface 328 configured to enable the processor 314 to communicate with and control various components of a robotic device. The processor 314 may include any of a variety of processing devices, for example any number of processor cores.

The term "system-on-chip" (SoC) is used herein to refer to a set of interconnected electronic circuits typically, but not exclusively, including one or more processors (e.g., 314), a memory (e.g., 316), and a communication interface (e.g., 318). The SoC 312 may include a variety of different types of processors 314 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SoC 312 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 312 may include one or more processors 314. The processing device 310 may include more than one SoC 312, thereby increasing the number of processors 314 and processor cores. The processing device 310 may also include processors 314 that are not associated with an SoC 312 (i.e., external to the SoC 312). Individual processors 314 may be multicore processors. The processors 314 may each be configured for specific purposes that may be the same as or different from other processors 314 of the processing device 310 or SoC 312. One or more of the processors 314 and processor cores of the same or different configurations may be grouped together. A group of processors 314 or processor cores may be referred to as a multi-processor cluster.

The memory 316 of the SoC 312 may be a volatile or non-volatile memory configured for storing data and processor-executable instructions for access by the processor 314. The processing device 310 and/or SoC 312 may include one or more memories 316 configured for various purposes. One or more memories 316 may include volatile memories such as random access memory (RAM) or main memory, or cache memory.

Some or all of the components of the processing device 310 and the SoC 312 may be arranged differently and/or combined while still serving the functions of the various aspects. The processing device 310 and the SoC 312 may not be limited to one of each of the components, and multiple instances of each component may be included in various configurations of the processing device 310.

Figure 4A:
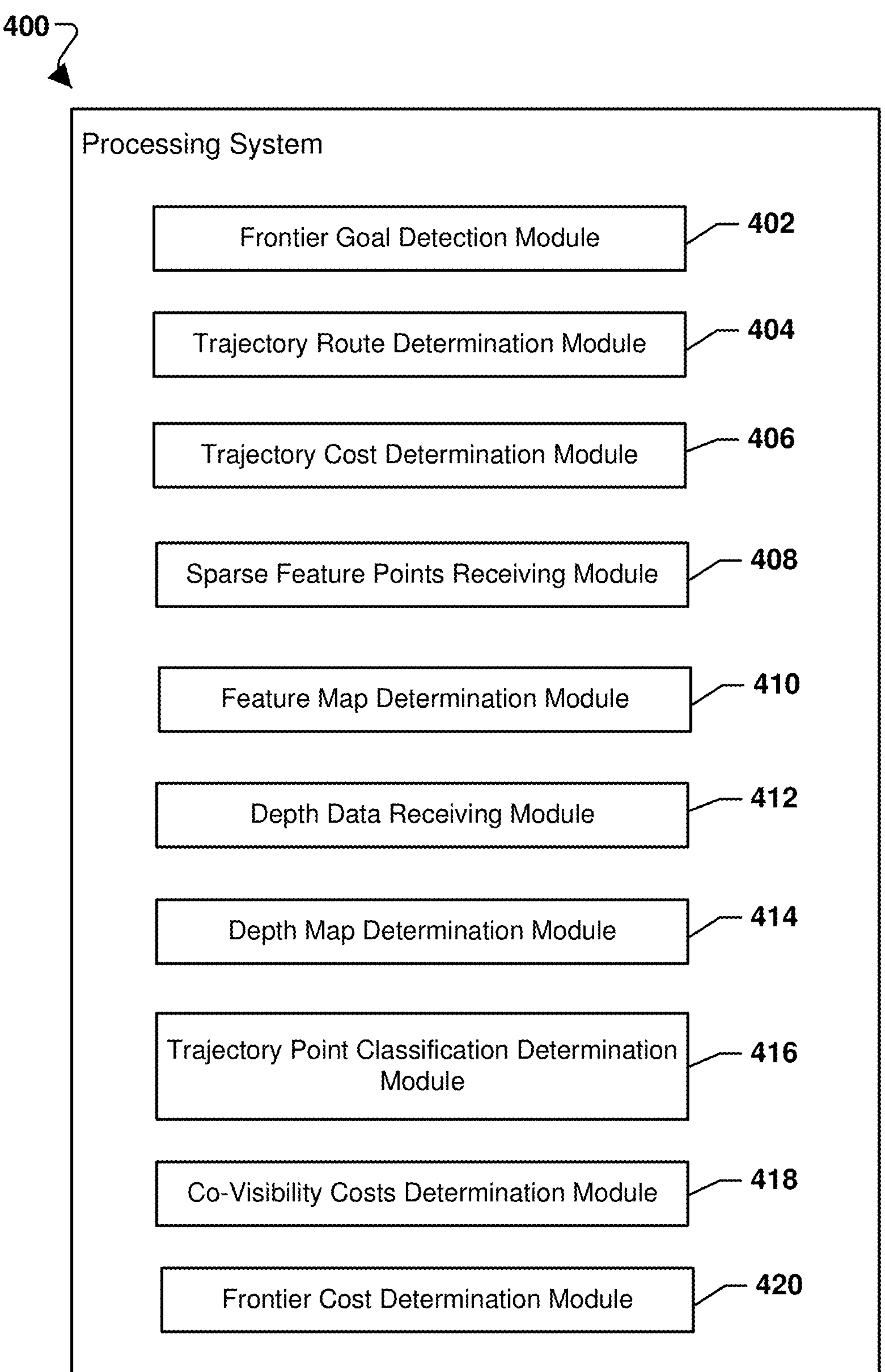
FIG. 4A is a component block diagram illustrating components of a processing system of a robotic device suitable for use with various embodiments.

FIG. 4A is a component block diagram illustrating a processing system 400 of a robotic device (e.g., 102, 200 in FIGS. 1 and 2) suitable for use with various embodiments. With reference to FIGS. 1-4A, the processing system 400 may be implemented in hardware components and/or software components of the robotic device, the operation of which may be controlled by one or more processors (e.g., the processor 220, the processing device 310, the SoC 312, and/or the like) of the robotic device, or a combination of hardware and software components. The processing system 400 may be configured by machine-readable or processor-executable instructions that may include one or more instruction modules. The instruction modules may include one or more of a frontier goal detection module 402, a trajectory route determination module 404, a trajectory cost determination module 406, a sparse feature points receiving module 408, a feature map determination module 410, a depth data receiving module 412, a depth map determination module 414, a trajectory point classification determination module 416, a co-visibility costs determination module 418, a frontier cost determination module 420, an available frontier goal selection module 422, as well as other instruction modules.

The frontier goal detection module 402 may be configured to detect frontier goals (e.g., 131, 132, 133 in FIG. 1) within a space (e.g., 120 in FIG. 1). The frontier goal detection module 402 may using imaging received from one or more cameras (e.g., 406) configured to capture light images that enter through one or more lenses. In some embodiments, the camera may be similar to the camera 103, 206. The camera 406 may provide image data to an image signal processor or processing module.

The trajectory route determination module 404 may be configured to calculate trajectory routes, such as shortest routes between the robotic device and each frontier goal. The calculated trajectory routes may be configured to pass though one or more intermediate sites en-route to a final frontier goal along a route. The trajectory route determination module 404 may use maps generated by the feature map determination module 410 and/or the depth map determination module 414. Similarly, the trajectory route determination module 404 may calculate a distance to any given trajectory point from a current position of the robotic device, which may be determined from the generated depth map and/or feature map.

The trajectory cost determination module 406 may be configured to determine trajectory costs ($F_{trajectory}$) for the robotic device traversing to each of a plurality of available frontier goals (e.g., 131, 132, 133) within the space (e.g., 120). The plurality of available frontier goals may include positions within the space from which the robotic device is configured to collect information to autonomously build a map of the space. In some embodiments, determining trajectory costs for the robotic device traversing to each of a plurality of available frontier goals within the space may include determining the trajectory costs for each of the plurality of available frontier goals based on a length, speed, and rotation associated with the respective available goal.

The sparse feature points receiving module 408 may be configured to receive sparse feature point information using visual SLAM (vSLAM).

The feature map determination module 410 may be configured to generate a feature map of the space for autonomous map building using the received sparse feature point information projected onto a horizontal plane.

The depth data receiving module 412 may be configured to receive inaccurate depth data including coarse details of the space for autonomous map building.

The depth map determination module 414 may be configured to generate a depth map using inaccurate depth data received by the depth data receiving module. A distance to the trajectory point from a current position of the robotic device is determined from the generated depth map and feature map The trajectory point classification determination module 416 may be configured to determine a classification for each trajectory point based on a distance to the trajectory point from a current position of the robotic device. Each classification may be associated with a different range of distance values.

The co-visibility costs determination module 418 may be configured to determine co-visibility costs ($F_{covisibility}$) for each of a select classification of the plurality of available frontier goals based on a ratio of a number of en-route trajectory points traversed to reach the respective available frontier goal over a length of a trajectory route used to reach the respective available frontier goal. The select classification may be associated with a lowest range of values of distances among a plurality of trajectory point classifications.

The frontier cost determination module 420 may be configured to determine a frontier cost ($F_{cost}$) for each of the plurality of available frontier goals based on a difference between the trajectory cost ($F_{trajectory}$) and the co-visibility cost ($F_{covisibility}$) of the respective available frontier goal. In some embodiments, determining a frontier cost for each of the plurality of available frontier goals based on a difference between the trajectory cost and the co-visibility cost of the respective available frontier goal may include determining the frontier cost for each of the plurality of available goals using lower resolution mapping than a higher resolution mapping used for navigation to the selected frontier goal. Low-resolution mapping may be defined by an area associated with the size of the robotic device, which may be a relatively larger area than that associated with an original imaging resolution. For example, if an original map resolution is 0.05 meters per pixel and the robotic device is 0.30 meters in length, then the low-resolution mapping used by be 0.30 meters per pixel. In contrast, the original imaging resolution may be considered "high resolution," particularly relative to the low-resolution mapping.

In some embodiments, determining trajectory costs for the robotic device traversing to each of a plurality of available frontier goals within the space by the frontier cost determination module 420 may include determining the determined trajectory costs for each of the plurality of available goals based on a sum of a friendliness cost and a rotation cost of the respective available frontier goal. In some embodiments, the frontier cost determination module 420 may base the friendliness cost for each of the plurality of available goals on a sum of the ratios of a length over a speed of each trajectory point along a route to the respective available frontier goal. In some embodiments, the frontier cost determination module 420 may base the rotation cost for each of the plurality of available goals on a duration of rotations required while traversing to the respective available frontier goal. In some embodiments, the frontier cost determination module 420 may determine the difference between the trajectory cost and the co-visibility cost of the respective available goals using first and second percentages of the trajectory cost and the co-visibility cost respectively, in which the sum of the first and second percentages is one.

The available frontier goal selection module 422 may be configured to select one of the plurality of available frontier goals having a lowest determined frontier cost ($F_{cost}$).

As used herein, the term "module" may refer to any component or set of components that perform the functionality attributed to the module. This may include one or more physical processors during execution of processor-readable instructions, the processor-readable instructions, circuitry, hardware, storage media (e.g., non-transitory processor-readable storage medium), or any other components.

Figure 4B:
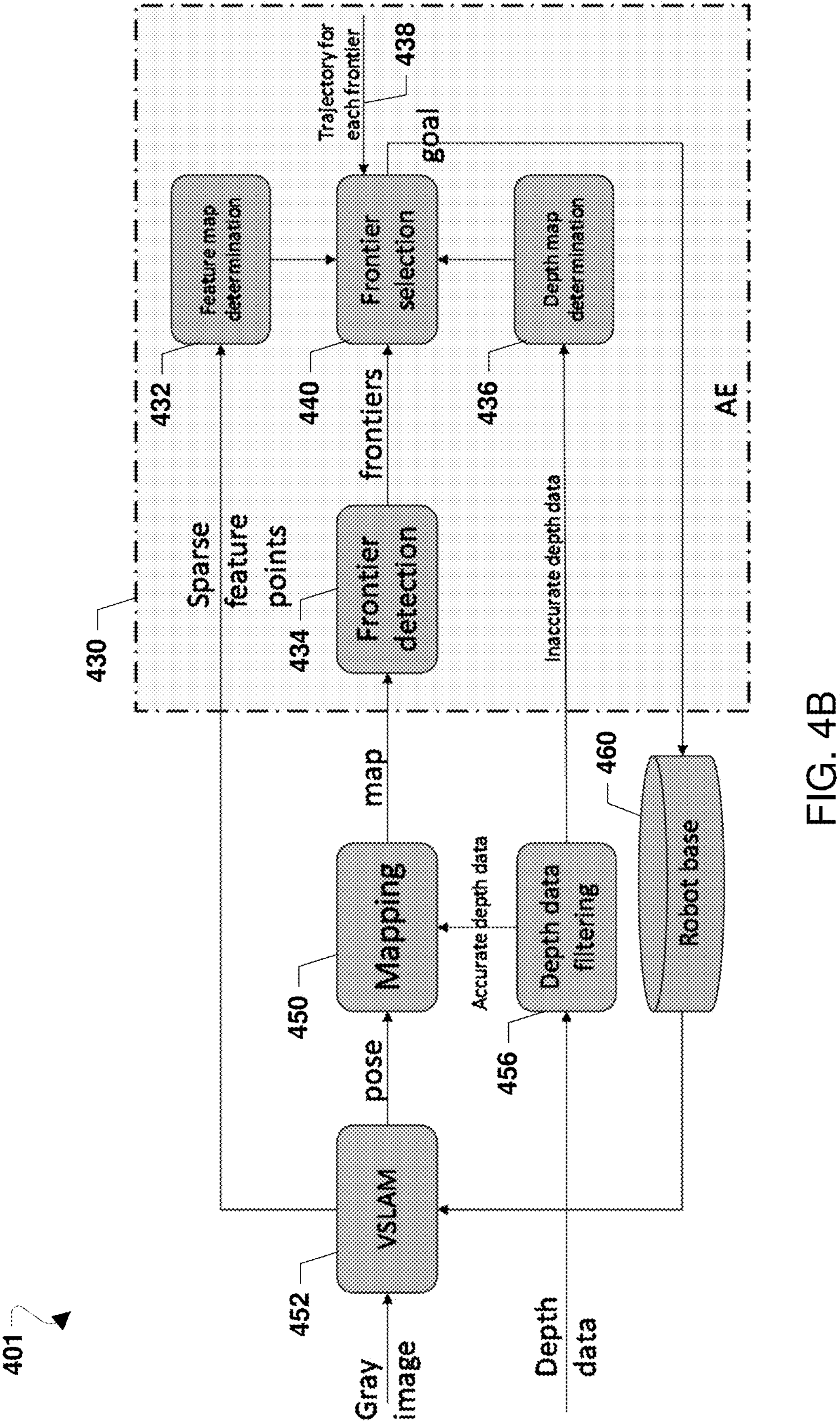
FIG. 4B is a schematic block diagram illustrating a system architecture of a processing system for selecting a frontier goal for autonomous map building within a space suitable for use with various embodiments.

FIG. 4B is a schematic block diagram illustrating a system architecture 401 suitable for implementing various embodiments. With reference to FIGS. 1-4B, the operation of the various components of the system architecture 401 may be controlled by one or more processors (e.g., the processor 220, the processing device 310, the SoC 312, and/or the like) of the robotic device, or a combination of hardware and software components. The various components of the system architecture 401 may include an automated exploration (AE) module 430, which may work in conjunction with a vSLAM 452, mapping module 450, depth data filtering module 456, and a robot base module 460 that is configured to mobilize the robotic device for exploration of a space. The AE module 430 may include a feature map determination module 432, frontier detection module 434, depth map determination module 436, and frontier trajectory information receiving module 438, each of which provides information to a frontier selection module 440. The frontier selection module 440 may use the multi-factor information received from the various modules to select a frontier goal for autonomous map building.

In various embodiments, the AE module 430 may select a frontier goal for the robotic device using trajectory information, contextual information, and a customized frontier selection strategy. The frontier goal may be selected from a plurality of frontier goals detected by the frontier detection module 434. The trajectory information may be obtained from the frontier trajectory information receiving module 438. The trajectory information for each frontier goal may be obtained using sensor inputs, such as cameras, proximity sensors, and other ranging techniques. The contextual information may be obtained by projecting sparse feature points from visual simultaneous localization and mapping (vSLAM) to a horizontal plane that determines a feature map. In addition, contextual information may be obtained by using inaccurate depth sensor data that may be used to make a depth map. Also, the AE module 430 may detect frontiers from more accurate mapping data maintained in the mapping module 450. The mapping data maintained by the mapping module 450 may include robotic device position information (i.e., pose) derived from the gray image data compiled by the vSLAM 452. Based on a given map, the robotic device's current position, and the available frontier information, the available trajectory information may include path length, rotation requirements, and whether the path is friendly. By combining the feature map and depth maps with the detected frontier information and frontier trajectories, the AE module 430 may select an appropriate frontier goal. The AE module 430 may also classify each frontier goal. For example, one classification may be "one-glance" frontier goals and another classification may be "multi-glance" frontier goals. The determined classification of a particular frontier goal may be based on the contextual information and the current partial map. A gain may be computed for each frontier by considering the co-visibility of the frontiers such that a frontier with a maximum computed gain may be selected as the robotic device's current goal.

Figure 5:
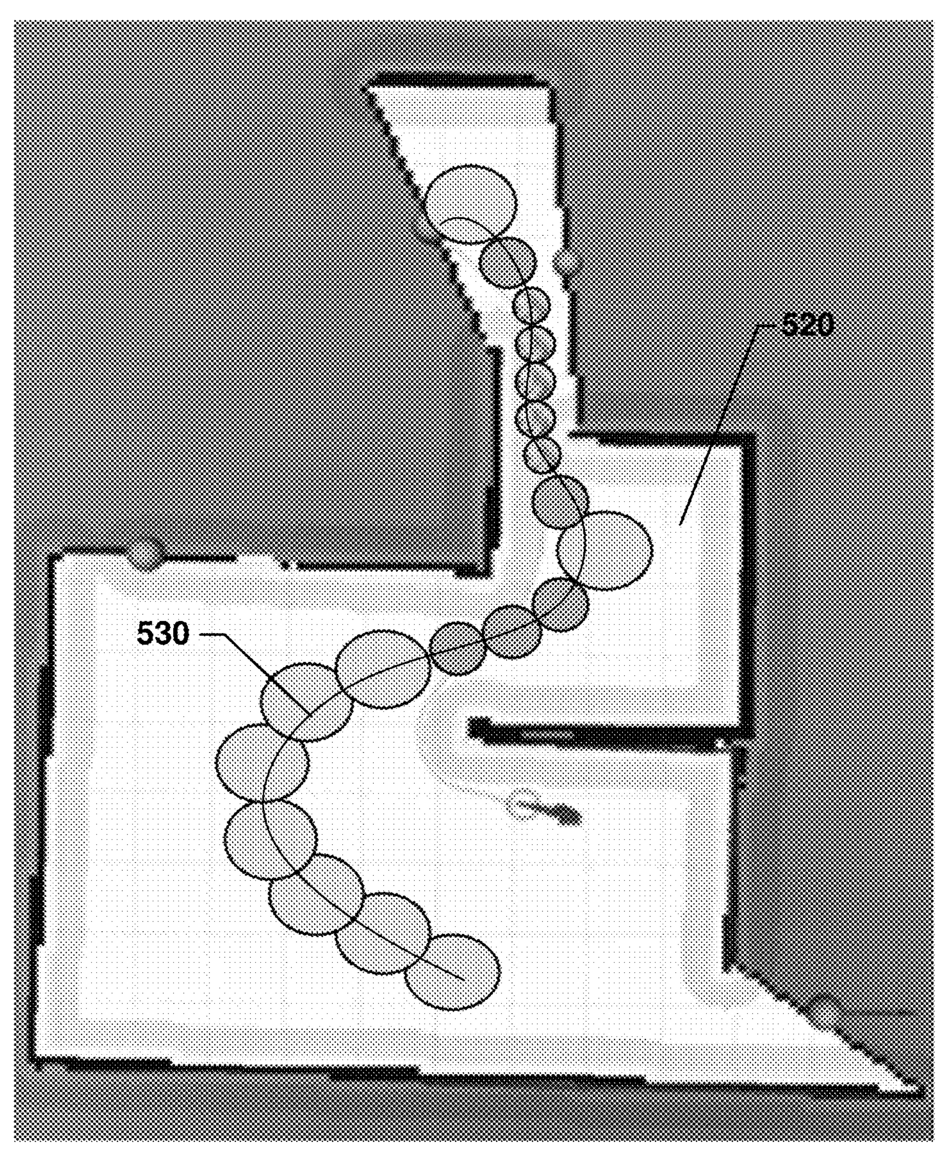
FIG. 5 is a plan view of an exploration space being explored by a robotic device in accordance with various embodiments.

FIG. 5 is a plan view of an exploration space 520 being explored by a robotic device illustrating how frontier goals may be classified in accordance with various embodiments. With reference to FIGS. 1-5, points (i.e., trajectory points) along a trajectory may each be classified into a category, such as smooth, slow, and congested road. Also, a robotic device speed for each category may be predetermined. Thus, the smooth road trajectory points may be associated with a first speed ($v_{smooth}$), the slow road trajectory points may be associated with a second speed ($v_{slow}$), and the congestion road trajectory points may be associated with a third speed ($v_{congested}$). Also, each trajectory point will be associated with a distance ($l_{smooth}$, $l_{slow}$, $l_{congested}$) the robotic device would travel to traverse that trajectory point. This allows the calculation of a distance cost $t_{length}$ for each trajectory point according to the following:

$$t_{length} = \frac{l_{smooth}}{v_{smooth}} + \frac{l_{slow}}{v_{slow}} + \frac{l_{congested}}{v_{congested}}. \tag{1}$$

Select trajectory points along the trajectory 530 may be sampled for a trajectory rotation analysis. In this way, the robot's orientation angle $\theta_i$ for the $i_{th}$ sample position may be calculated according to the following:

$$\Delta\theta_i = |\theta_i - \theta_{i-1}|. \tag{2}$$

Thus, a rotational time cost $t_{rotation}$ for rotation while traveling the trajectory may be calculated according to the following:

$$t_{rotation} = \frac{1}{v_{rotation}} \sum\nolimits_{i=0}^{n} \Delta\theta_i \qquad \Delta\theta_i \in [0, \pi]. \tag{3}$$

Accordingly, a total trajectory cost $F_{trajectory}$ may be calculated according to the following:

$$F_{trajectory} = t_{length} + t_{rotation}. \tag{4}$$

In various embodiments, a frontier classification may be determined from a map fusion that combines feature map determinations, depth map determinations, and more accurate mapping information. The sparse feature points from vSLAM (i.e., 3-D elements) may be projected onto a horizontal plane (i.e., a two-dimensional projection, such as an X-Y axis) that defines a feature map. The AE module (e.g., 420) may take coordinate information from the sparse feature points maintained by the feature map determination module (e.g., 432) and overlay or merge them on or with inaccurate depth data maintained by the depth map determination module (e.g., 436) and more accurate depth data maintained by the mapping module (e.g., 450). The merged or fused maps may be maintained by the mapping module, which may be configured to provide suitable information used to classify each frontier trajectory.

The frontier detection module (e.g., 434) may calculate a smallest distance di for a given trajectory point $i_{th}$ in a currently considered frontier goal from the occupied area in the fused maps. Using the calculated smallest distance di, a classification value C for that trajectory point may be determined based on a distance to the trajectory point from a current position of the robotic device. In this way, each classification value C may be associated with a range of distance values. For example, a first range of classification values less than a first predetermined distance $T_1$ may be used to classify those trajectory points (e.g., One-glance trajectory points) and a second range of classification values greater than or equal to a second predetermined distance $T_2$ may be used to classify those trajectory points (e.g., Multi-glance trajectory points). In this way, a select classification (e.g., the one-glance) may be associated with a lowest range of values of distances among a plurality of trajectory point classifications and another select classification (e.g., the multi-glance) may be associated with a higher range of values of distances among a plurality of trajectory point classifications.

Figure 6:
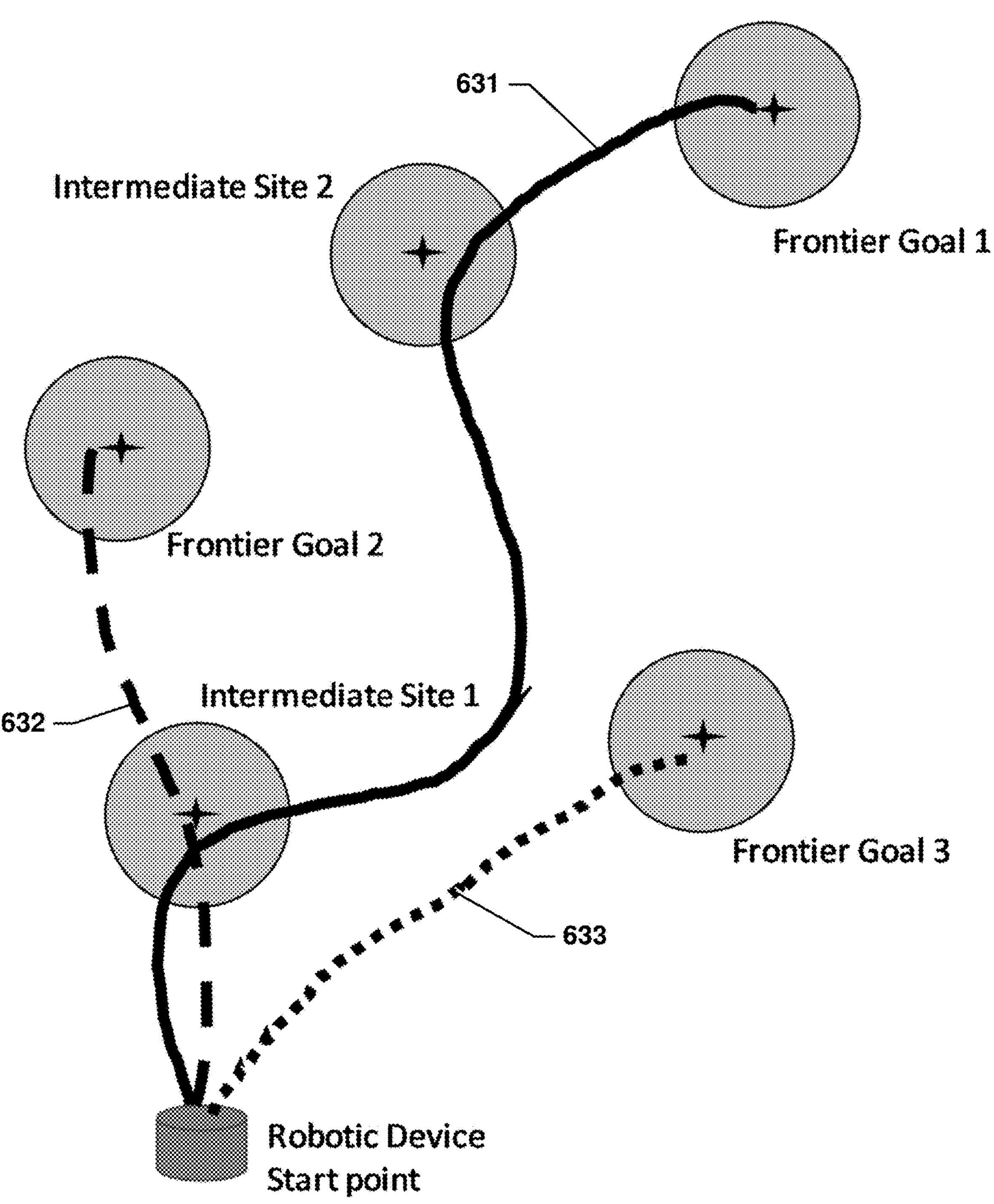
FIG. 6 is a plan view of several trajectories illustrating how co-visibility information may be extracted in accordance with various embodiments.

FIG. 6 is a plan view of several robotic device trajectories, illustrating how co-visibility information may be extracted in accordance with various embodiments. With reference to FIGS. 1-5, three available frontier goals 1, 2, 3 have been determined as one-glance frontier goals. In this way, in some embodiments only the one-glance frontier goals are considered available frontier goals for selection. In addition, a couple of inlier frontier goals (intermediate site 1 and intermediate site 2) are identified, which are frontier goals disposed along any trajectory 631, 632, 633 leading to an available frontier goal 1, 2, 3. Thus, the intermediate site 1 is disposed along the first and second trajectories 631, 632, while no intermediate site is associated with the third trajectory 633, which leads only to frontier goal 3. It should be noted that the first trajectory 631 includes two inlier frontier goals, namely intermediate site 1 and intermediate site 2.

Co-visibility represents the effect of any particular frontier goal on other frontier goals, particularly the available frontier goals 1, 2, 3, which are one-glance frontier goals. However, the co-visibility cost $F_{covisibility}$ is subtracted from trajectory cost $F_{trajectory}$ when calculating a total frontier cost $F_{cost}$. Thus, a lower co-visibility cost $F_{covisibility}$ will result a higher total frontier cost $F_{cost}$.

Co-visibility cost $F_{covisibility}$ may be calculated according to the following:

$$F_{covisibility} = \frac{\text{count of inliers}}{Tran_{length}}, \quad (5)$$

The co-visibility cost $F_{covisibility}$ reflects that the most efficient frontier goal to select is the one with short trajectories passing through the greatest number of inliers. Thus, in FIG. 6 the Frontier Goal 1 would have the lowest co-visibility cost $F_{covisibility}$, with each available frontier goal have a co-invisibility cost relative to the others as follows:

$$F_{covisibility}^{Frontier\ Goal\ 1} > F_{Frontier\ Goal\ 1}^{Frontier\ Goal\ 2} > F_{Frontier\ Goal\ 1}^{Frontier\ Goal\ 3}. \quad (6)$$

Thus, various embodiments provide a motivation to select a frontier goal with the smallest time cost and which makes the relatively highest amount of other frontier goals disappear if selected.

In addition, a total frontier goal cost $$F_{cost}^{i}$$

may be calculated according to the following:

$$F_{COST} = \propto F_{trajectory} - \beta f_{covisibility} \quad (7)$$

where $$\alpha + \beta = 1 \text{ (e.g., if } \alpha = 0.8 \text{, the } \beta = 0.2).$$

In this way, a difference between the trajectory cost $F_{trajectory}$ and the co-visibility cost $f_{covisibility}$ of the respective available goals is determined using first and second percentages of the trajectory cost $F_{trajectory}$ and the co-visibility cost $f_{covisibility}$ respectively. Also, the sum of the first and second percentages is one (1).

Figure 7A:
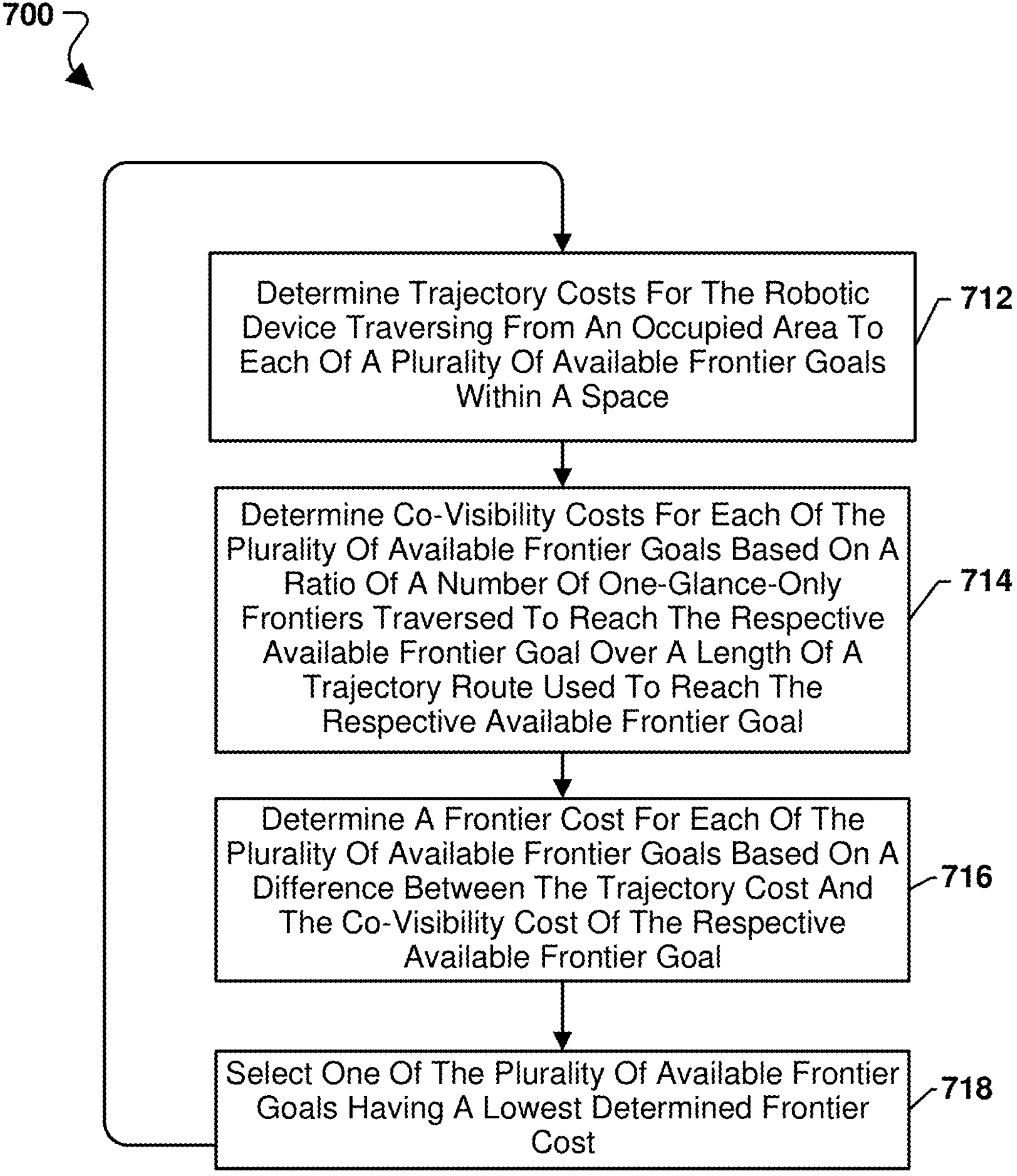

FIG. 7A is a process flow diagram illustrating a method 700 of selecting a frontier goal for autonomous map building within a space performed by a processing device for use in a robotic device according to various embodiments. With reference to FIGS. 1-7A, the operations of the method 700 may be performed by a processor of a robotic device (e.g., the processor 220, the processing device 310, the SoC 312, and/or the like).

In block 712, the processor of the robotic device may determine trajectory costs for the robotic device traversing to each of a plurality of available frontier goals within the space. The plurality of available frontier goals include positions within the space from which the robotic device is configured to collect information to autonomously build a map of the space. In some embodiments, determining trajectory costs for the robotic device traversing to each of a plurality of available frontier goals within the space may include determining the trajectory costs for each of the plurality of available frontier goals based on a length, speed, and rotation associated with the respective available goal. In some embodiments, determining trajectory costs for the robotic device traversing to each of a plurality of available frontier goals within the space may include determining the determined trajectory costs for each of the plurality of available goals based on a sum of a friendliness cost and a rotation cost of the respective available frontier goal. In some embodiments, the friendliness cost for each of the plurality of available goals may be based on a sum of the ratios of a length over a speed of each trajectory point along a route to the respective available frontier goal. In some embodiments, the rotation cost for each of the plurality of available goals may be based on a duration of rotations required while traversing to the respective available frontier goal.

In block 714, the processor may determine co-visibility costs for each of a select classification of the plurality of available frontier goals based on a ratio of a number of en-route trajectory points (i.e., inliers) traversed to reach the respective available frontier goal over a length of a trajectory route used to reach the respective available frontier goal. In some embodiments, the processor may determine the co-visibility cost based on a ratio of a number of one-glances-only frontiers traversed to another available frontier goal and a length of the respective trajectory. Thus, the goal selection may be associated with a lowest ratio among the plurality of available frontier goals.

In block 716, then processor may determine a frontier cost for each of the plurality of available frontier goals based on a difference between the trajectory cost and the co-visibility cost of the respective available frontier goal. In some embodiments, determining a frontier cost for each of the plurality of available frontier goals based on a difference between the trajectory cost and the co-visibility cost of the respective available frontier goal may include determining the frontier cost for each of the plurality of available goals using lower resolution mapping than a higher resolution mapping used for navigation to the selected frontier goal. In some embodiments, the difference between the trajectory cost and the co-visibility cost of the respective available goals may be determined using first and second percentages of the trajectory cost and the co-visibility cost respectively. The sum of the first and second percentages may total one.

In block 718, the processor may select one of the plurality of available frontier goals having a lowest determined frontier cost to use in traversing to a next location for mapping the area. As part of the operations in block 718, the robotic device may travel to the selected frontier goal. Following the operations in block 718 and reaching the selected frontier goal, the robotic device may again survey the area and select the next frontier goal in block 712. The operations in the method 700 may be repeated by the robotic device until the area is has been mapped.

FIG. 7B is a process flow diagram illustrating a method 702 of selecting a frontier goal for autonomous map building within a space performed by a processing device for use in a robotic device according to some embodiments. With reference to FIGS. 1-7B, the operations of the method 702 may be performed by a processor of a robotic device (e.g., the processor 220, the processing device 310, the SoC 312, and/or the like).

Following the operations in block 712 of the method 700, the processor may classifying each of the plurality of available frontier goals as either a one-glance-only or a multi-glance frontier using contextual information in block 720. Each one-glance-only frontier may be closer to the occupied area than the multi-glance frontiers. Each classification may be associated with a different range of distance values. Also, the select classification may be associated with a lowest range of values of distances among the plurality of available frontier goals. In some embodiments, the processor may consider each of the one-glance-only frontiers that need to be traversed to reach an available frontier goal to be an inlier of that frontier goal. In some embodiments, the processor may include the cost of one or more inliers in the co-visibility costs.

Following the operations in block 720, the processor may perform the operations in block 714 of the method 700 as described.

FIG. 7C is a process flow diagram illustrating a method 704 of selecting a frontier goal for autonomous map building within a space performed by a processing device for use in a robotic device according to some embodiments. With reference to FIGS. 1-7C, the operations of the method 704 may be performed by a processor of a robotic device (e.g., the processor 220, the processing device 310, the SoC 312, and/or the like).

Following the operations in block 712 of the method 702, the processor may receive inaccurate depth data including coarse details of the space for autonomous map building in block 722.

In block 724, the processor may generate a depth map using the received inaccurate depth data.

In block 726, the processor may receive sparse feature point information using vSLAM.

In block 728, the processor may generate a feature map of the space for autonomous map building using the received sparse feature point information projected onto a horizontal plane. The distance to the trajectory point from a current position of the robotic device may be determined from the generated depth map and feature map.

Following the operations in block 728, the robotic device may again survey the area and select the next frontier goal in block 712 of the method 700 as described.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods and operations 700, 702, and 704 may be substituted for or combined with one or more operations of the methods 700, 702, and 704, and vice versa.

Implementation examples are described in the following paragraphs. While some of the following implementation examples are described in terms of example methods, further example implementations may include: the example methods discussed in the following paragraphs implemented by a robotic device including a processing device configured to perform operations of the example methods; the example methods discussed in the following paragraphs implemented by a robotic device including means for performing functions of the example methods; and the example methods discussed in the following paragraphs implemented as a non-transitory processor-readable storage medium having stored thereon processor-executable instructions configured to cause a processing device of a robotic device to perform the operations of the example methods.

Example 1. A method executed by a processor of a robotic device for selecting a frontier goal for autonomous map building within a space, including determining trajectory costs for the robotic device traversing from an occupied area to each of a plurality of available frontier goals within the space, wherein the plurality of available frontier goals include positions within the space from which the robotic device is configured to collect information to autonomously build a map of the space; determining co-visibility costs for each of the plurality of available frontier goals based on a ratio of a number of one-glance-only frontiers traversed to reach the respective available frontier goal over a length of a trajectory route used to reach the respective available frontier goal; determining a frontier cost for each of the plurality of available frontier goals based on a difference between the trajectory cost and the co-visibility cost of the respective available frontier goal; and selecting one of the plurality of available frontier goals having a lowest determined frontier cost.

Example 2. The method of example 1, in which determining trajectory costs for the robotic device traversing to each of a plurality of available frontier goals within the space includes determining the trajectory costs for each of the plurality of available frontier goals based on a length, speed, and rotation associated with the respective available goal.

Example 3. The method of either examples 1 or 2, in which determining a frontier cost for each of the plurality of available frontier goals based on a difference between the trajectory cost and the co-visibility cost of the respective available frontier goal includes determining the frontier cost for each of the plurality of available goals using lower resolution mapping than a higher resolution mapping used for navigation to the selected frontier goal.

Example 4. The method of any of examples 1-3, in which determining trajectory costs for the robotic device traversing to each of a plurality of available frontier goals within the space includes determining the determined trajectory costs for each of the plurality of available goals based on a sum of a friendliness cost and a rotation cost of the respective available frontier goal.

Example 5. The method of example 4, in which the friendliness cost for each of the plurality of available goals is based on a sum of the ratios of a length over a speed of each trajectory point along a route to the respective available frontier goal.

Example 6. The method of example 4, in which the rotation cost for each of the plurality of available goals is based on a duration of rotations required while traversing to the respective available frontier goal.

Example 7. The method of any of examples 1-6, further including classifying each of the plurality of available frontier goals as either a one-glance-only or a multi-glance frontier using contextual information, in which each one-glance-only frontier is closer to the occupied area than the multi-glance frontiers.

Example 8. The method of example 7, further including receiving inaccurate depth data including coarse details of the space for autonomous map building; generating a depth map using the received inaccurate depth data; receiving sparse feature point information using visual simultaneous localization and mapping (vSLAM); generating a feature map of the space for autonomous map building using the received sparse feature point information projected onto a horizontal plane; and determining a distance to a trajectory point along a route to a frontier goal from a current position of the robotic device is determined from the generated depth map and feature map.

Example 9. The method of any of examples 1-8, in which the difference between the trajectory cost and the co-visibility cost of the respective available goals is determined using first and second percentages of the trajectory cost and the co-visibility cost respectively, in which a sum of the first and second percentages is one.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method executed by a processor of a robotic device for selecting a frontier goal for autonomous map building within a space, comprising:

determining trajectory costs for the robotic device traversing from an occupied area to each of a plurality of available frontier goals within the space, wherein the plurality of available frontier goals include positions within the space from which the robotic device is configured to collect information to autonomously build a map of the space;

classifying each of the plurality of available frontier goals as either a one-glance-only or a multi-glance frontier using contextual information, wherein each one-glance-only frontier is closer to the occupied area than the multi-glance frontiers;

determining co-visibility costs for each of the plurality of available frontier goals, wherein the co-visibility costs are based on one or more effects between the plurality of available frontier goals including a ratio of a number of one-glance-only frontiers traversed to reach the respective available frontier goal over a length of a trajectory route used to reach the respective available frontier goal;

determining a frontier cost for each of the plurality of available frontier goals based on a difference between a trajectory cost and a co-visibility cost of the respective available frontier goal;

selecting one of the plurality of available frontier goals having a lowest determined frontier cost; and applying a control signal to a vehicle based on the selected one of the plurality of available frontier goals to cause the robotic device to move.

2. The method of claim 1, wherein determining the trajectory costs for the robotic device traversing to each of the plurality of available frontier goals within the space comprises determining the trajectory costs for each of the plurality of available frontier goals based on a length, speed, and rotation associated with the respective available goal.

3. The method of claim 1, wherein determining the frontier cost for each of the plurality of available frontier goals based on the difference between the trajectory cost and the co-visibility cost of the respective available frontier goal comprises determining the frontier cost for each of the plurality of available goals using lower resolution mapping than a higher resolution mapping used for navigation to the selected frontier goal.

4. The method of claim 1, wherein determining the trajectory costs for the robotic device traversing to each of the plurality of available frontier goals within the space comprises determining the determined trajectory costs for each of the plurality of available goals based on a sum of a friendliness cost and a rotation cost of the respective available frontier goal.

5. The method of claim 4, wherein the friendliness cost for each of the plurality of available goals is based on a sum of the ratios of a length over a speed of each trajectory point along a route to the respective available frontier goal.

6. The method of claim 4, wherein the rotation cost for each of the plurality of available goals is based on a duration of rotations required while traversing to the respective available frontier goal.

7. The method of claim 1, further comprising:

receiving inaccurate depth data including coarse details of the space for autonomous map building;

generating a depth map using the received inaccurate depth data;

receiving sparse feature point information using visual simultaneous localization and mapping (vSLAM);

generating a feature map of the space for autonomous map building using the received sparse feature point information projected onto a horizontal plane; and determining a distance to a trajectory point along a route to a frontier goal from a current position of the robotic device from the generated depth map and feature map.

8. The method of claim 1, wherein the difference between the trajectory cost and the co-visibility cost of the respective available goals is determined using first and second percentages of the trajectory cost and the co-visibility cost respectively, wherein a sum of the first and second percentages is one.

9. A robotic device, comprising:

a camera; and a processor coupled to the camera and configured to:

determine trajectory costs for the robotic device traversing from an occupied area to each of a plurality of available frontier goals within a space, wherein the plurality of available frontier goals include positions within the space from which the robotic device is configured to collect information to autonomously build a map of the space;

classify each of the plurality of available frontier goals as either a one-glance-only or a multi-glance frontier using contextual information, wherein each one-glance-only frontier is closer to the occupied area than the multi-glance frontiers, determine co-visibility costs for each of the plurality of available frontier goals, wherein the co-visibility costs are based on one or more effects between the plurality of available frontier goals including a ratio of a number of one-glance-only frontiers traversed to reach the respective available frontier goal over a length of a trajectory route used to reach the respective available frontier goal;

determine a frontier cost for each of the plurality of available frontier goals based on a difference between a trajectory cost and a co-visibility cost of the respective available frontier goal;

select one of the plurality of available frontier goals having a lowest determined frontier cost; and apply a control signal to a vehicle based on the selected one of the plurality of available frontier goals to cause the robotic device to move.

10. The robotic device of claim 9, wherein the processor is configured to determine trajectory costs for the robotic device traversing to each of the plurality of available frontier goals within the space comprises determining the trajectory costs for each of the plurality of available frontier goals based on a length, speed, and rotation associated with the respective available goal.

11. The robotic device of claim 9, wherein the processor is configured to determine the frontier cost for each of the plurality of available frontier goals based on a difference between the trajectory cost and the co-visibility cost of the respective available frontier goal comprises determining the frontier cost for each of the plurality of available goals using lower resolution mapping than a higher resolution mapping used for navigation to the selected frontier goal.

12. The robotic device of claim 9, wherein the processor is configured to determine the trajectory costs for the robotic device traversing to each of the plurality of available frontier goals within the space comprises determining the determined trajectory costs for each of the plurality of available goals based on a sum of a friendliness cost and a rotation cost of the respective available frontier goal.

13. The robotic device of claim 12, wherein the processor is configured to determine the friendliness cost for each of the plurality of available goals based on a sum of the ratios of a length over a speed of each trajectory point along a route to the respective available frontier goal.

14. The robotic device of claim 12, wherein the processor is configured to determine the rotation cost for each of the plurality of available goals based on a duration of rotations required while traversing to the respective available frontier goal.

15. The robotic device of claim 9, wherein the processor is further configured to:

receive inaccurate depth data including coarse details of the space for autonomous map building;

generate a depth map using the received inaccurate depth data;

receive sparse feature point information using visual simultaneous localization and mapping (vSLAM);

generate a feature map of the space for autonomous map building using the received sparse feature point information projected onto a horizontal plane; and determine a distance to a trajectory point along a route to a frontier goal from a current position of the robotic device is determined from the generated depth map and feature map.

16. The robotic device of claim 10, wherein the processor is configured to determine the difference between the trajectory cost and the co-visibility cost of the respective available goals using first and second percentages of the trajectory cost and the co-visibility cost respectively, wherein a sum of the first and second percentages is one.

17. A robotic device, comprising:

means for determining trajectory costs for the robotic device traversing from an occupied area to each of a plurality of available frontier goals within a space, wherein the plurality of available frontier goals include positions within the space from which the robotic device is configured to collect information to autonomously build a map of the space;

means for classifying each of the plurality of available frontier goals as either a one-glance-only or a multi-glance frontier using contextual information, wherein each one-glance-only frontier is closer to the occupied area than the multi-glance frontiers;

means for determining co-visibility costs for each of the plurality of available frontier goals, wherein the co-visibility costs are based on one or more effects between the plurality of available frontier goals including a ratio of a number of one-glance-only frontiers traversed to reach the respective available frontier goal over a length of a trajectory route used to reach the respective available frontier goal;

means for determining a frontier cost for each of the plurality of available frontier goals based on a difference between a trajectory cost and a co-visibility cost of the respective available frontier goal;

means for selecting one of the plurality of available frontier goals having a lowest determined frontier cost; and means for applying a control signal to a vehicle based on the selected one of the plurality of available frontier goals to cause the robotic device to move.

18. The robotic device of claim 17, wherein means for determining trajectory costs for the robotic device traversing to each of the plurality of available frontier goals within the space comprises means for determining the trajectory costs for each of the plurality of available frontier goals based on a length, speed, and rotation associated with the respective available goal.

19. The robotic device of claim 17, wherein means for determining the frontier cost for each of the plurality of available frontier goals based on a difference between the trajectory cost and the co-visibility cost of the respective available frontier goal comprises means for determining the frontier cost for each of the plurality of available goals using lower resolution mapping than a higher resolution mapping used for navigation to the selected frontier goal.

20. The robotic device of claim 17, wherein means for determining the trajectory costs for the robotic device traversing to each of a plurality of available frontier goals within the space comprises means for determining the determined trajectory costs for each of the plurality of available goals based on a sum of a friendliness cost and a rotation cost of the respective available frontier goal.

21. The robotic device of claim 20, further comprising means for determining the friendliness cost for each of the plurality of available goals based on a sum of the ratios of a length over a speed of each trajectory point along a route to the respective available frontier goal.

22. The robotic device of claim 20, further comprising means for determining the rotation cost for each of the plurality of available goals based on a duration of rotations required while traversing to the respective available frontier goal.

23. The robotic device of claim 17, further comprising:

means for receiving inaccurate depth data including coarse details of the space for autonomous map building;

means for generating a depth map using the received inaccurate depth data;

means for receiving sparse feature point information using visual simultaneous localization and mapping (vSLAM);

means for generating a feature map of the space for autonomous map building using the received sparse feature point information projected onto a horizontal plane; and means for determining a distance to a trajectory point along a route to a frontier goal from a current position of the robotic device is determined from the generated depth map and feature map.

24. The robotic device of claim 17, wherein means for determining the frontier cost for each of the plurality of available frontier goals based on a difference between the trajectory cost and the co-visibility cost of the respective available frontier goal comprises means for determining the difference between the trajectory cost and the co-visibility cost of the respective available goals using first and second percentages of the trajectory cost and the co-visibility cost respectively, wherein a sum of the first and second percentages is one.

25. A non-transitory processor-readable medium having stored thereon processor-executable instructions configured to cause a processor of a robotic device to perform operations comprising:

determining trajectory costs for the robotic device traversing from an occupied area to each of a plurality of available frontier goals within a space, wherein the plurality of available frontier goals include positions within the space from which the robotic device is configured to collect information to autonomously build a map of the space;

classifying each of the plurality of available frontier goals as either a one-glance-only or a multi-glance frontier using contextual information, wherein each one-glance-only frontier is closer to the occupied area than the multi-glance frontiers;

determining co-visibility costs for each of the plurality of available frontier goals, wherein the co-visibility costs are based on one or more effects between the plurality of available frontier goals including a ratio of a number of one-glance-only frontiers traversed to reach the respective available frontier goal over a length of a trajectory route used to reach the respective available frontier goal;

determining a frontier cost for each of the plurality of available frontier goals based on a difference between a trajectory cost and a co-visibility cost of the respective available frontier goal;

selecting one of the plurality of available frontier goals having a lowest determined frontier cost; and applying a control signal to a vehicle based on the selected one of the plurality of available frontier goals to cause the robotic device to move.

* * * * *